US012780370B2

(12) United States Patent
Comisky et al.

(10) Patent No.: US 12,780,370 B2
(45) Date of Patent: Nov. 3, 2026

(54) AUTOMATED DRAFTING SYSTEM

(71) Applicants: David Allan Comisky, St Charles, IL (US); Trey Matthew Busch, Jackson, MO (US); Taylor Bradley Busch, Lake St Louis, MO (US)

(72) Inventors: David Allan Comisky, St Charles, IL (US); Trey Matthew Busch, Jackson, MO (US); Taylor Bradley Busch, Lake St Louis, MO (US)

( * ) Notice: Subject to any disclaimer, the term of this patent is extended or adjusted under 35 U.S.C. 154(b) by 213 days.

(21) Appl. No.: 18/113,597

(22) Filed: Feb. 23, 2023

(65) Prior Publication Data

US 2023/0242225 A1 Aug. 3, 2023

Related U.S. Application Data

(60) Provisional application No. 63/293,761, filed on Dec. 25, 2021.

(51) Int. Cl.
*B63B 79/15* (2020.01)
*G01S 17/08* (2006.01)

(52) U.S. Cl.
CPC .............. *B63B 79/15* (2020.01); *G01S 17/08* (2013.01)

(58) Field of Classification Search
CPC ......... B63B 79/15; B63B 79/10; B63B 39/12; B63B 35/00; B63H 20/007; G08B 29/046; B64U 70/20; G01B 21/18
See application file for complete search history.

(56) References Cited

U.S. PATENT DOCUMENTS

| | | | | |
|---|---|---|---|---|
| 5,662,505 A * | 9/1997 | Spriggs | B63H 20/007 | 440/6 |
| 2009/0112510 A1* | 4/2009 | Crane | G01B 21/18 | 702/174 |
| 2013/0200207 A1* | 8/2013 | Pongratz | B64U 70/20 | 244/2 |
| 2018/0234806 A1* | 8/2018 | Olsen | G08B 29/046 | |
| 2023/0236012 A1* | 7/2023 | Baji | B63B 79/10 | 356/11 |

FOREIGN PATENT DOCUMENTS

| | | | |
|---|---|---|---|
| CN | 207157437 U * | 3/2018 | B63B 35/00 |
| WO | WO-2018096190 A1 * | 5/2018 | B63B 39/12 |

* cited by examiner

*Primary Examiner* — Yuri Kan
(74) *Attorney, Agent, or Firm* — Patent 360; Barry Choobin

(57) ABSTRACT

A system and method for calculating a draft/freeboard for a vessel. The system includes multiple sensor units, wherein each sensor unit includes a housing; a distance sensor to sense a freeboard from various positions in the vessel. The sensor unit includes a coupling member, such as magnets coupled to the housing that allow the sensor units to be mounted to the vessel. The sensor units can connect to a control unit for processing data and presenting the measurements. The system can calculate drafts from the freeboard data, wherein the freeboard data can be determined from different positions of the vessel.

11 Claims, 4 Drawing Sheets

AUTOMATED DRAFTING SYSTEM

CROSS-REFERENCE TO RELATED APPLICATIONS

This application claims priority from a U.S. Provisional Patent Appl. No. 63/293,761 filed on Dec. 25, 2021, which is incorporated herein by reference in its entirety.

FIELD OF INVENTION

The present invention relates to a system and method for measuring the draft of a waterborne vessel, and more particularly, the present invention relates to an automated system and method for vessel draft measuring.

BACKGROUND

Proper loading and balancing of a barge are commonly known as 'drafting'. The term draft or draught refers to one of many dimensions of a waterborne vessel. The draft is the distance between the ship's keel and the water line. The term draft can also be defined as a measure of the amount of submergence of a ship's hull in the water. While the height of the vessel above the water line i.e., between the water line and upper deck is referred to as freeboard. The height of the vessel is equal to the combined heights of the draft and the freeboard. Measuring the draft is essential to ensure the stability of a waterborne vessel while carrying a maximum load. Also maintaining proper draft is essential for ensuring that the vessel will not become grounded during transport into variable depth (e.g., shallower) waters.

Generally, in a floating vessel, the height of the freeboard is measured, and the draft can be measured from the total height of the vessel minus the freeboard height. This is because measuring freeboard height is easier.

Typical drafting/free-boarding procedures used during vessel loading involve one or more operators measuring the distance from the upper deck to the waterline, with a variety of techniques ranging from draft sticks, tape measures, or other such devices. Such procedures, however, are laborious and time-consuming, as all four corners of the vessel must be measured simultaneously. This is because the draft of the vehicle varies along the length. Also, the loading procedure must be paused between the measurements for correlation. The measuring process using a stick, or any other measuring device requires the operator to lean over the rim of the upper deck which makes the process riskier for the operator.

To aid in this, many vessels are constructed with painted or in some cases welded numbers/lines on the side so that as the vessel is filled, the operator(s) can read the visible lines/numbers. This is a marginal improvement to safety, though still generally requires leaning over the side to make a measurement which is admittedly at best an eyeballed opinion. Other environmental factors such as rain, fog, ice, winds, and waves further challenge these methods, both posing additional safety risks as well as the introduction of errors and inconsistency in the measurements. Such inconsistency in and of itself creates added safety and productivity challenges for those tasked with loading the vessels properly.

Considering the challenges faced by the shipping industry, it is highly desirable to augment or replace the known drafting procedures with something safer, accurate, consistent, and reliable. A need is therefore appreciated for a safe, accurate, consistent, and cost-effective solution to address the aforesaid problems.

Hereinafter the terms "controller" and "control unit" are interchangeably used.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an automated system and method for measuring the draft of a waterborne vessel that overcomes the aforesaid problems with conventional measuring systems and methods.

It is another object of the present invention that the automated system makes the process of measuring the draft safer.

It is still another object of the present invention that the automated system and method are reliable with high accuracy.

It is a further object of the present invention that the automated system can operate in adverse climatic conditions.

It is yet another object of the present invention that the errors in draft measurements and problems resulting from such errors can be avoided and undesired expenses could be saved.

It is still a further object of the present invention that the automated system is cost-effective.

It is an additional object of the present invention that inconsistencies in the measurements can be avoided, and the measurements are reproducible.

A system and method for calculating a draft/freeboard of a waterborne vessel, the system includes one or more sensor units, wherein each of the one or more sensor units includes: a housing; a distance sensor configured to determine a freeboard of the waterborne vessel, the distance sensor encased within the housing; a coupling member coupled to the housing, the coupling member is configured to allow the sensor unit to be mounted to the waterborne vessel; and a control unit configured to receive data from the distance sensor. The coupling member comprises one or more magnets. Each of the one or more sensor units further comprises: a radio member configured to connect each of the one or more sensor units to the control unit. The system further comprises: a gateway unit operably coupled to the one or more sensor units, wherein the gateway unit is configured to aggregate data from the one or more sensors, wherein the gateway is configured to connect to the control unit. The distance sensor is selected from a group consisting of Lidar, Sonar, Radar, infrared distance sensor, and/or a combination thereof. Each of the one or more sensor units further comprises: an inclinometer configured to detect an elevation/tilt of the waterborne vessel. The one or more sensor units configured to determine freeboard from one or more corners of the waterborne vessel, the control unit configured to receive dimensions of the waterborne vessel through an interface; receive tilt information of the waterborne vessel in at least two dimensions at 90 degrees from the one or more sensors; determine a placement of the one or more sensors on the waterborne vessel; and determine freeboard from a second corner, third corner and a fourth corner from the tilt information, the freeboard for the first corner and the placement of the one or more sensors. The control unit is configured to determine draft of the waterborne vessel from dimensions of the waterborne vessel and the measured freeboard by the one or more sensors.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
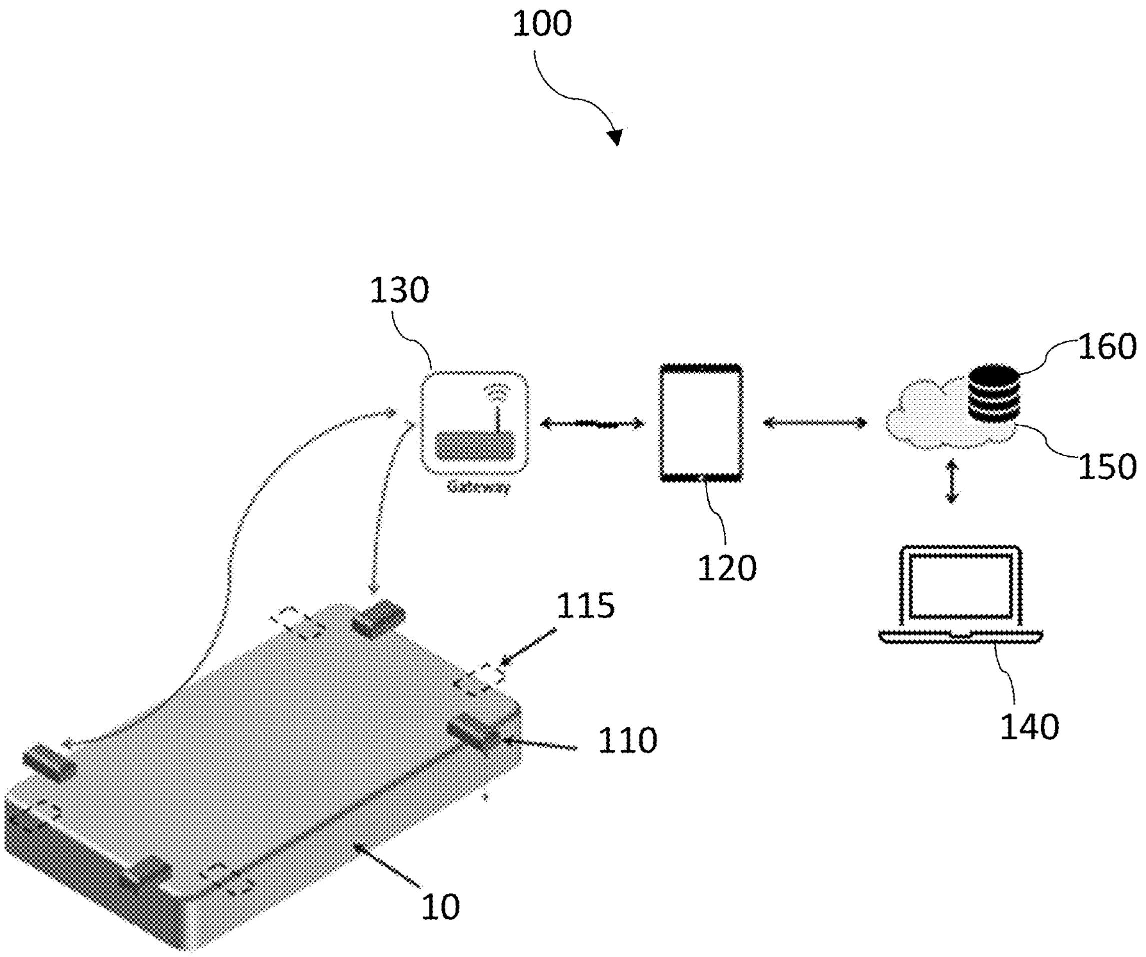
FIG. 1 is a block diagram showing an overview of an automated system, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed are a system and method for automated measurement of a draft of a vessel safely and accurately. The disclosed system does not require an operator to lean over the rim of the upper deck, thus avoiding the risks and dangers with conventional measurement methods. Moreover, once installed, the disclosed system can be operated remotely avoiding the need for the operator to be present at the upper deck. The disclosed system can provide continuous measurements while loading, thus change in draft measurements while loading can be monitored. There is no need to pause the loading operation while taking the measurements. The disclosed system can be operational day and night, and in adverse weather conditions.

The disclosed system can allow measuring freeboard height from different points on the upper deck. Advantageously, by using a different number of sensors, measurements for different points/corners on the vessel can be taken simultaneously. The disclosed system and method allow for meeting regulatory requirements, thus preventing monetary fines and delays. The disclosed system by allowing the fusion of several sensing technologies allows automation of the measurement process. Such a fusion allows the disclosed system to calibrate itself, enables a significantly more flexible set of configuration and sensor placement options, and allows the disclosed system to be used in virtually any loading configuration.

Moreover, the disclosed system can provide real-time data in a format defined by the user. The system can be integrated with network capabilities that allow sending data through electronic means, such as emails. Wired or wireless connection to remote computing devices can be established for monitoring and viewing the data. The disclosed system can also provide automated reporting logs and user-specified warning and stop limits.

In one implementation, the disclosed system can provide draft measurements of the vessel as required by regulatory requirements by taking draft measurements from one, two, three, or four corners of the vessel. The disclosed system can use the measurement data taken from one or more corners/positions on the vessel and can further use the vessel information to compensate for any missing data i.e., when the measurements from all the corners of the vessel cannot be taken. The vessel information can be obtained through controllers of the vessel itself or can be manually input. The fusion of sensor technologies allows the disclosed automated system to measure the draft of a vessel using one or more sensors, and such measurements are reliable without loss of any accuracy. Reliable measurements can be taken using a single sensor only, thus making the disclosed system versatile and useful in a variety of climate conditions and can be adapted to different vessel types. In operation, a single sensor can provide freeboard data. The sensor can determine tilt information in at least two dimensions at 90 degrees to one another. Also, the orientation of the sensor, the vessel size, and sensor placement can be preconfigured. The disclosed system by using the above information including the freeboard data and tilt information can establish the other datum points by extrapolation without physical measurements. The disclosed system also allows for self-calibration and making offsets to said extrapolations if the sensor is not placed in perfect 'squareness' to the extrapolated locations. Other extrapolation techniques can also be employed and are within the scope of the present invention, such as using freeboard data to self-level said tilt sensors of 'other' sensors in real-time, both with and without user intervention. Similarly, a 3-point freeboard measurement is sufficient to establish a $4^{th}$ corner for example for most vessels.

Referring to FIG. 1 provides an overview of the disclosed system. The system 100 can include one or more sensors 110 that can be placed at different positions in a vessel 10 and remain there for the duration of the loading process. The number of sensors used can depend upon several factors, such as the type of vessel, load on the vessel, climate, time of loading, and the like. However, the use of one or more sensors is within the scope of the present invention. Each sensor provides a variety of data, including but not limited to, ambient temperature (for compensation purposes), freeboard distance to the water (when placed in a partially overhanging configuration), and elevation by an inclinometer (for augmenting the freeboard measurements and bridging certain missing sensor measurements). The sensors can be encased in a housing that protects the sensors from dust and water. Suitable circuitry for functions, such as battery monitoring, tamper detection, and device orientation (which aids in power management and user experience) can also be provided. A battery to power the sensor and charging circuitry can also be encased within the housing. Each sensor unit includes such detection mechanisms, a small microprocessor for aggregating the data from different sensing technologies and cleaning the data from noises, and a low-power radio for connecting to a control unit/gateway/controller of the disclosed system for sending the data. Said radios and supporting firmware may also be used for configuration and tuning of the sensor units or RF networks to optimize the system for each installation as needed. It is to be noted that the sensors can send the raw data which can be processed by the controller.

The sensor units can be powered from an integrated rechargeable battery also encased within the housing of the sensor unit. Suitable charging ports can also be provided for connecting the sensor unit to a power supply for charging the battery. Instead of wired charging, wireless charging can also be used and is within the scope of the present invention.

Each sensor unit can further include a mounting member that can be used to mount the sensor unit to the vessel. The mounting member can be an integrated magnet or an array of magnets that can magnetically couple to the vessel. It is understood that the mounting member can be a fastening means either permanent or temporary, and any suitable fastening means, such as adhesive, screws, clips, and the like are within the scope of the present invention.

The housing of the sensor unit can be sealed to prevent the ingress of water. The charging port can also be sealed and waterproofed. Moreover, each sensor unit can be made such as it remains afloat. For example, in case of an accidental drop from the vessel into the water, the sensor unit remains afloat and could be retrieved.

When not in use, the disclosed sensor unit can automatically switch to a standby mode for saving power. The disclosed sensor unit can support advanced power-saving features. The disclosed sensor unit may include a timer circuitry and orientation sensor for monitoring the status of the sensor unit. Each sensor unit can be sized and weighted such that an operator can carry the sensor units safely and efficiently in a single trip while navigating the uneven and sometimes slippery deck of a vessel. The operator while carting the disclosed sensor units may also have to carry gangplanks or ladders that may be required.

FIG. 1 shows four sensor units 110 mounted near four corners of a vessel 10. Vessel 10 can be a ship and four sensor units are shown mounted on the upper deck. Alternate positions for the sensor units are shown by dashed line 115. FIG. 1 only shows the freeboard area of the vessel, i.e., the vessel above the water line.

The disclosed system can further include a controller 120. The controller can be a computing device that includes a processor and memory. The processor can be any logic circuitry that responds to, and processes instructions fetched from the memory. The memory may include one or more memory chips capable of storing data and allowing any storage location to be directly accessed by the processor. The memory includes modules according to the present invention for execution by the processor to perform one or more steps of the disclosed methodology. The controller can also include a display for presenting the information. The controller can also include an input interface for receiving data, wherein the input interface can be connected to an input device, such as a keyboard, touch panel, and the like. The terms controller, control unit, processing unit, a computing device are interchangeably used herein. In certain implementations, the controller can be a laptop, desktop computer, workstation, client computer, smartphone, and the like electronic devices.

The controller can include suitable software for processing the data received from the sensor units. A suitable graphical user interface can also be provided for viewing the reported data. For example, measurements in a reported format can be presented through the graphical user interface. The disclosed controller can also send the data to an external device, such as a smartphone or desktop computer. The measurement data can be presented on a remote device for monitoring, via wired or wireless communication standards such as Ethernet, wireless ethernet (Wi-Fi), and cellular data technologies.

The controller can connect to the different sensor units through gateway 130. As shown in the drawing, the different sensor units can connect through a common gateway that can be within the wireless range of the sensor units. The gateway can aggregate data from different sensor units and the data from the gateway can be communicated to the controller. The features of the gateway can however be incorporated into the controller itself, and the gateway can be optional. Alternatively, the embodiments of the gateway can be incorporated into the sensor units and the gateway can become optional. The gateway can communicate with the sensor units at different frequency ranges, such as low-frequency radio networks for greater range. The gateway can use suitable protocols to find and connect to the sensor units, such as pinging the sensor units and determining the best suitable network for connecting. Each sensor node can include the same dual-band radios in the first implementation, but the architecture allows for operation with or without a gateway, allowing for the highest degree of optimization for a given installation taking into account factors such as regulatory restrictions, battery life, redundancy, and reliability needs. However, the use of a gateway can be preferable for bridging from a sub 1 GHz (nominally 433, 868, or 915 MHz, depending on territory) RF network used by the sensors to a 2.4 GHz BLE network for connection to the controller 120 comprising a tablet or phone.

The gateway can also be operated on battery power and recharged similarly to the sensing nodes; however, in many/most installations mains power may be available and can be used (e.g., the charger left plugged in all the time). The gateway can also be a self-contained unit; e.g., the battery and coupling member which can be magnets can be provided. Only a charging port is exposed to the user, and as mentioned above, is often left plugged in all the time if the main power is conveniently close to the gateway location; which is typically close to the operator.

In one implementation, the graphical user interface can be provided to include a vessel graphic. The GUI may allow viewing the vessel graphic from different viewing angles, such as from the point of view of the loading operator. This is nominal, though not restricted to, looking at the side or top of the vessel, from a stationary position. By way of example, considering a barge loading facility, the loader may typically be in a control room on the shoreside of the river looking at the barge. The most crucial data that can be displayed to the loader may include at least the freeboard measurements of each corner of the vessel, wherein measurements from the four corners of the vessel are commonly used to establish both the draft (or fullness) and the levelness.

The disclosed system and method primarily measure the freeboard height of the vessel; however, the draft can be calculated from the measured freeboard height. The system can receive the depth of the vessel as a vessel depth parameter which can be used to determine the draft from the freeboard measurement data. The system can present the measurements for either the freeboard or draft or both, depending upon the requirements of the user. Moreover, the units of measurement can also be configured in the disclosed system by the user. Note that both pieces of information are desired to ensure proper loading (or overloading) and transportability once the loading is completed. For example, an average draft of the vessel might be within target, but if one end of the vessel is significantly more/less out of the water, it might be sailable without excess energy/effort or a safety risk. Similarly, a perfectly level draft that is 4" too high or too low results in an efficiency loss or a safety concern respectively. In addition to the raw corner data, the disclosed system also provides a visual representation of the center of mass for the vessel, which updates in real time as the load(ing) is shifted around the vessel. Said real-time center of mass information is also augmented with colors that indicate user responses supplied 'Warn' and 'Stop' limits.

For example, if a loader wishes to end at a 34" freeboard, the 'Stop' limit can be set to 34", but a 'Warn' limit might be set at 2-3" before this limit, which can aid in telling the user to slow down, or possibly take a little more care positioning the last of the load if it's not level. For cargo that is brought in piecemeal (think grain trucks, cement, coal, cargo containers from semi-tractor trailers) this also can aid in the overall operation by giving the user a warning when he/she is nearing the end of a load and can top it off with fewer said pieces or slow down the loading process to prevent exceeding of the limits.

The disclosed system through the interface may also allow the user to adjust/compensate for an uneven loading/sensor placement surface, wherein adjustments can be made to each sensor unit based on the location of the sensor unit. For example, it is common for the bow (front) of many vessels to be 'ramped up' to allow for less drag as they move in the water. In the world of vessel loading, this is called 'raking', but the implication is that a measurement from the end of the rake down to the water would be different than the same measurement made near the center of the vessel port or starboard side even when in level. The disclosed system can allow an offset to be added (or subtracted) from each sensor location to account for such variances. The disclosed system provides a user-input method for vessel displacement of onboard water as well.

It is widely known that "anything that floats, also leaks", and the bigger the vessel, the bigger the leak is. Even well-cared-for vessels will take on rain, or small leaks over time, such factors are mostly built into the construction of the vessel. Examples include bilge pumps on large ships and wing tanks for more passive vessels like barges. In either case, it is common for a user to measure the water amount (usually a depth) to establish the amount and weight of water onboard. The disclosed system through the interface may allow this to be entered such that it can be subtracted from the cargo load so the user knows exactly how much intentional material versus the overall load the vessel can take.

In certain implementations, the interface can be provided as application software that can be installed on the user's device. The application software can be developed for Android™, iOS, and any other known operating platform for mobile devices. The application software can be made available through a distribution service provider, for example, Google Play™ operated and developed by Google, and the app store by Apple. In addition to the application software, a website-based interface can also be provided through the world-wide-web. The application software can also be provided for the desktop environment, such as Windows™, Linux, and macOS. The user interface may permit interaction with a user through the user device, wherein information can be presented within the user interface by system 100 and information can be received by system 100 from the user.

In certain implementations, the draft information obtained from the disclosed system can also be used to make fairly accurate estimates of a vessel's load based on the displacement of water as it is loaded, which can be directly correlated to the freeboard/draft measurements being made by the disclosed system. By incorporating a user-input scaling factor, this is easily displayed in units that are meaningful to the loader. For example, for loading the grains, the user might input the unit as the number of pounds per bushel so that the end display is in bushels loaded. In another example, a loader of coal may want measurement units as cubic yards. The disclosed system allows for a simple scaling factor to be specified by the user so that the data is presented in the most user-appropriate form.

All of the above parameters can be updated in near real-time constantly as the vessel is loaded. The update rate can also be configured during installation.

The interface provided by the disclosed system can include several other user-friendly features, such as a resettable/pause-able timer to establish loading times, the ability to name/label the barge, add user notes to each barge load, generate user-friendly emails to notify others of the vessel/loading/dock status. Loader and Dock data and location can also be provided.

Because of the high computational power (relative to individual sensor measurement requirements) and rich user-interface facilities of the controller 120, many features can be added to aid in the loading process. Two such features are explicitly called as implemented in the initial manifestation.

The first is an autonomous 'start' and 'stop' (or beginning and end) of the loading process. That is, because the controller 120 constantly monitors multiple sensors reporting freeboard and tilt data and further can save off (some) history of such; with a simple algorithm incorporating overall load percentage or similar metrics, the system controller is able to determine that the vessel loading process has begun with no user interaction on the controller interface. In the simplest terms, the only requirement is the aforementioned placement of one of more sensors 110 onto the vessel that establish one/more freeboard measurement and the actual or extrapolated tilt angles of two perpendicular axis along the vessel sides. The load can then proceed as it normally would; with the described system able to note the empty (starting) freeboard/draft measurements autonomously. In a similar fashion, when the vessel loading process is complete; while the user can interact with the controller interface directly to note stoppage of the loading process, an alternative method can also be provided allowing a deckhand to simply remove one or more of the sensors 110 from vessel deck. The integrated tilt sensors can detect this event and when processed by the controller; which can then revert back to the "just prior" state of the sensors to capture the state of the load. In both the start and stop cases; these functions work may work in tandem with, or completely independent of the controller operator's actions; enabling maximum efficiency and robustness of captured empty/full vessel draft levels.

An additional feature enabled through the system controller's capabilities greatly enhances the system's value to the end user in terms of efficiency and training of new or inexperienced personnel. As vessels are loaded, there is often a need to add material in a back-and-forth style near the end to ensure proper balance (bow-stern and starboard-port). Movement of a large vessel is generally available via large crane or winch systems; but such capabilities move slowly and thus come the expense of time and electrical energy; plus adds extra safety concerns as on-board personnel time is increased. Rather a more efficient method would be to load the vessel balanced all in a single pass, and then replicate such success over and over on future loads. This is easily achievable and highly flexible using the method and apparatus described herein; as the controller memory can store history and templates of ideal loading scenarios; and then display them to the user before and during the active loading process. In the simplest of terms; the system controller application can display to the operator the target location for a payload; along with target freeboard/draft on one/more of the corners of the vessel. For example, during the initial phases of a load as payload is added to one corner, it might be desired to continue to add material until the target freeboard/draft for that corner of the vessel is say 15% past its final draft target (as is common, since as load is added to the other end/corners, this corner will return to target draft). The next load location might similarly have an over (or under) draft target, but relative to one or more corners, which may in fact be different than the first corner where the load started. The application is completely flexible as to which corners and the percentage of over/under target draft; as well as enabling weighting of each. Steps are stored in a linked-list format and can then be replayed by the controller as steps; proceeding to the next step once the active load has mirrored the ideal/template load to within specified tolerances. The number of steps/link-list entries is near limitless; though in practice there are no more than 18 load points for a grain commodity barge; and in many cases only 6-8 might be required. For open-top barges (coal, stone, etc.) the number might be 3-5 at most. The value to the system owner/operator is great; as each load can be guided by the controller user interface application to achieve consistent results every time; and also serve as a means to train new operators using the experienced/best operators as the gold standard. Template/playback functions may be sourced and/or extracted from the controller 120 via alternate viewing/control terminals 140; optionally stored or shared in remote server locations 150/160 or kept locally on said controller such that each owner/operator can manage their own loading techniques or share across multiple sites/communities as they desire.

Lastly, the data being collected and updated in real-time can optionally be made available for remote viewing and storage on external servers. This data can be stored in a secured and encrypted database for which secured access, such as passwords can be created for gaining access. The disclosed system allows specifying what data can be shared and with whom, and how much of the data can be shared. In certain embodiments, certain data can be presented through a web interface which can be accessed from a variety of electronic devices, such as a smartphone. The data relating to simple logging, tracking efficiency over time, monitoring system performance, battery status, battery health, errors and performance issues, and the like can be presented.

Figure 4:
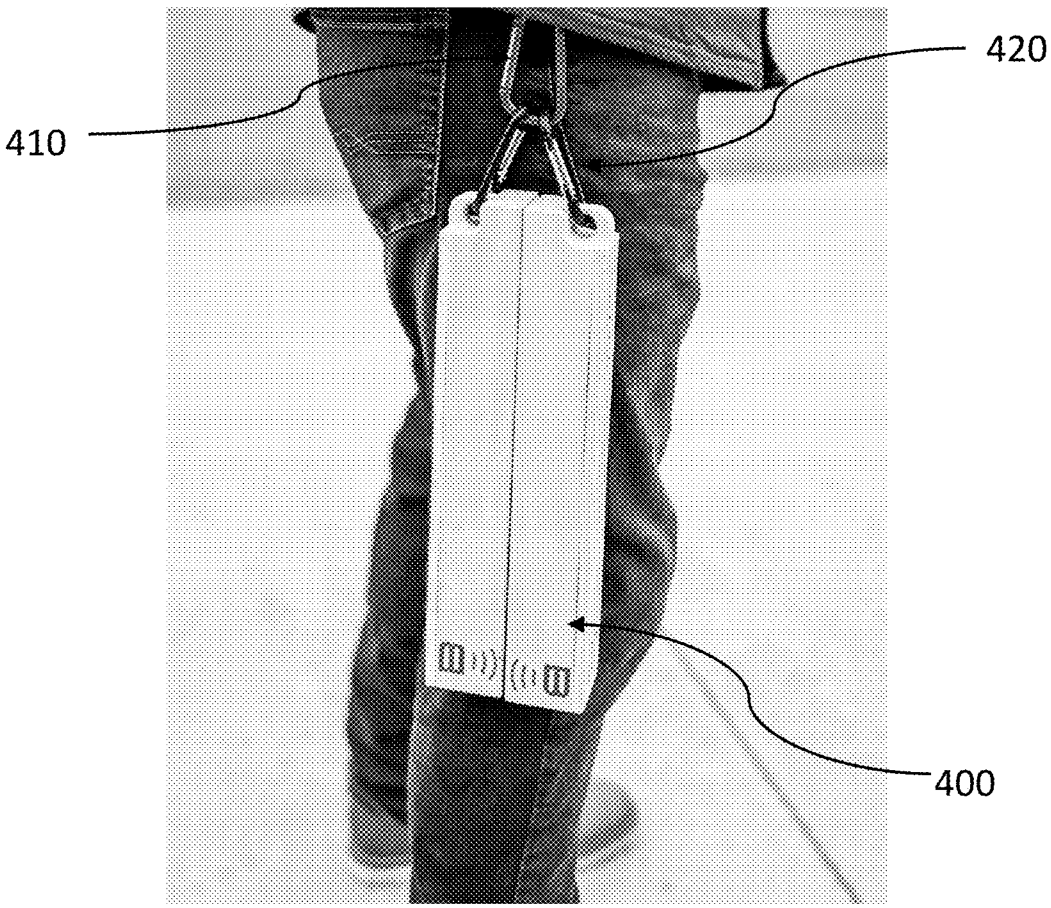
FIG. 4 shows sensor units of the disclosed system carried by a worker, according to an exemplary embodiment of the present invention.

The sensor units can be light in weight that can be easily carried around for installation on the upper deck. The housing of the sensor unit can also include a hook that allows the sensor units to be hung from a supporting structure. For example, FIG. 4 shows two sensor units 400 hooked to a belt 410 that can be worn by an operator and the two sensor units 400 hung at side of the operator. The housing of the sensor units has hooks 420 to couple any loop or similar structure mounted to the operator. Thus, the operator can one-by-one install the sensor units while the remaining sensor units remain secured with the operator. It is understood that the sensor units can be hooked to any supporting structure, such as a belt, loops, and the like.

To save power, the disclosed system can automatically transition between low power mode/passive mode/standby mode and operational mode/active mode based on sensor orientation; requiring no interaction other than being placed onto a vessel for measurement. If the sensor is rotated onto any other axis than its normal operating position (i.e., while drafting), the sensor can automatically transition into low-power mode/or be turned off completely.

In certain implementations, each sensor unit including the gateway can also be equipped with a sonar transducer encased within the respective housing for better protection in the event the sensor unit or the gateway unit is dropped in water or handled roughly. The sonar transducer is designed to be oriented in a fashion to avoid obstacles and obstructions along the surface of the vessel wall. The integrated magnets can hold the sensor units to the deck of the vessel but can also help align and hold the sensor units together making it easier to carry multiple sensor units as a set. This allows the user to seamlessly clip the sensor units onto a life vest or similar apparatus.

In certain implementations, up to four sensor units can be placed in multiple positions on the vessel (corners) and can be interchanged at any time before/during/after the loading process, making the system configurable and flexible to meet the needs of the operator/operation.

Due to the fusion of different sensor technologies (i.e., sonar and an inclinometer), the user can fully operate the disclosed system with just two or even one sensor unit on the vessel. Even in this scenario, the disclosed system can provide all four draft measurements (projected/estimated drafts) of the vessel in near real-time. For example, in certain loading configurations, based on how the barge is positioned next to the dock or other barges/obstacles, the operator may sometimes be unable to place a sensor unit at each of the four draft marking locations around the vessel, as shown in FIG. 1. The disclosed system is capable of projecting multiple estimated draft measurements based on measured sensor data and calculations projected from knowing the geometry of the vessel. The operator can apply a distance offset to each sensor unit in real-time within the interface to help apply adjustments as needed to the draft measurements.

In certain implementations, the disclosed system can support an RF network architecture for communication, wherein repeaters can also be used to cover the range based on the size of the vessel. The system offers the coexistence of multiple systems through RF diversity, temporal diversity, and security code diversity. This allows the operator to put multiple systems together in proximity without interference/crosstalk.

In certain implementations, the housing of the sensor units can have their outer surfaces designed for high visibility (safety yellow) and have alignment marks for proper placement.

The disclosed system can provide suitable interfaces for different electronic devices, such as tablet computers. The interface can be a configurable user interface that augments the barge loading procedure and can be easily customizable. The interface may allow the operator to select the hull depth of the barge quickly and easily while the vessel is being loaded by using the interface. The operator can quickly and easily switch or flip the barge orientation within the interface based on which way the bow and stern are positioned during loading. The operator can quickly and easily switch between different units of measurement within the interface (i.e., inches, feet, and inches, etc.). The operator can quickly and easily switch from freeboard measurements to draft measurements in the interface.

When operating the disclosed system on a raked barge, the interface allows the operator to select a "Rake Offset" dial within the interface to quickly and easily account for the additional height that the bow of a raked barge adds to the freeboard/draft, as well as enabling the controller to adapt for adjusted draft positions used when extrapolating draft measurements not directly measured with a sensor 110.

This allows for a more accurate draft reading when loading a raked barge. The operator can set a target draft or target freeboard within the user interface. Warning and stop limits can be set by the operator to help augment the various loading stages. Within the interface, the middle portion of the vessel includes a circular icon that represents the center of mass of the payload. It can be thought of as a "level bubble" to quickly indicate the levelness of the vessel. This level of bubble color is influenced by the aforementioned limits. The color thresholds are configurable and can be set by the user within the interface. Within the interface, the operator can set the "trim" and "tilt" limits or tolerance of error from front-to-back and side-to-side of the barge. The trim and tilt limits will also set the window for the "level bubble." Within the interface, the operator can set tonnage targets. Using the real-time draft data from the drafting sensors, estimated tonnages are provided in real-time. The Sensor measurements can also be homologated to produce an estimate of the percentage of the load. The Operator programmable scaling factors allow conversion of tonnage/percent of load to more applicable limits (e.g., bushels, gallons, etc.). The disclosed system provides a user-input method for vessel displacement of onboard water, allowing for a more accurate reading of the payload tonnage. The operator can easily enter the amount of water contained in the vessel to be subtracted from payload calculations.

In one implementation, each sensor unit can have a temper-resistant housing. Moreover, the sensor units can be equipped with a self-diagnosis feature that can monitor the health of the sensor unit and report any error and the health status to the controller autonomously. Moreover, the sensor units can detect noises including waves and disruptions at the surface of the water, and these noises can be accounted for in the measurements. For example, the measurements can be processed through a multi-stage weighted average of previously filtered measurements, which allows the disclosed system to yield a more consistent, reliable readout to the operator.

In certain implementations, the data can be logged on to an external database, such as on a cloud server. The disclosed system can support real-time data logging/logistics tracking. Richly formatted logs of the following types: Snapshot, completed barge load (e.g., start and stop status), and Daily/weekly/monthly logs of vessel status. Bridging to cloud data services and/or websites for Remote viewing, Remote configuration, and Integration into existing logistics platforms/control systems.

FIG. 1 shows vessel 10 and the disclosed system 100, wherein sensor units 110 are shown mounted to vessel 10. A gateway unit 130 connects the sensor units to a controller 120. The controller can connect to an external computing device 140 through a network 150. The disclosed system also allows storing data on external servers 160 which includes cloud servers.

Figure 2:
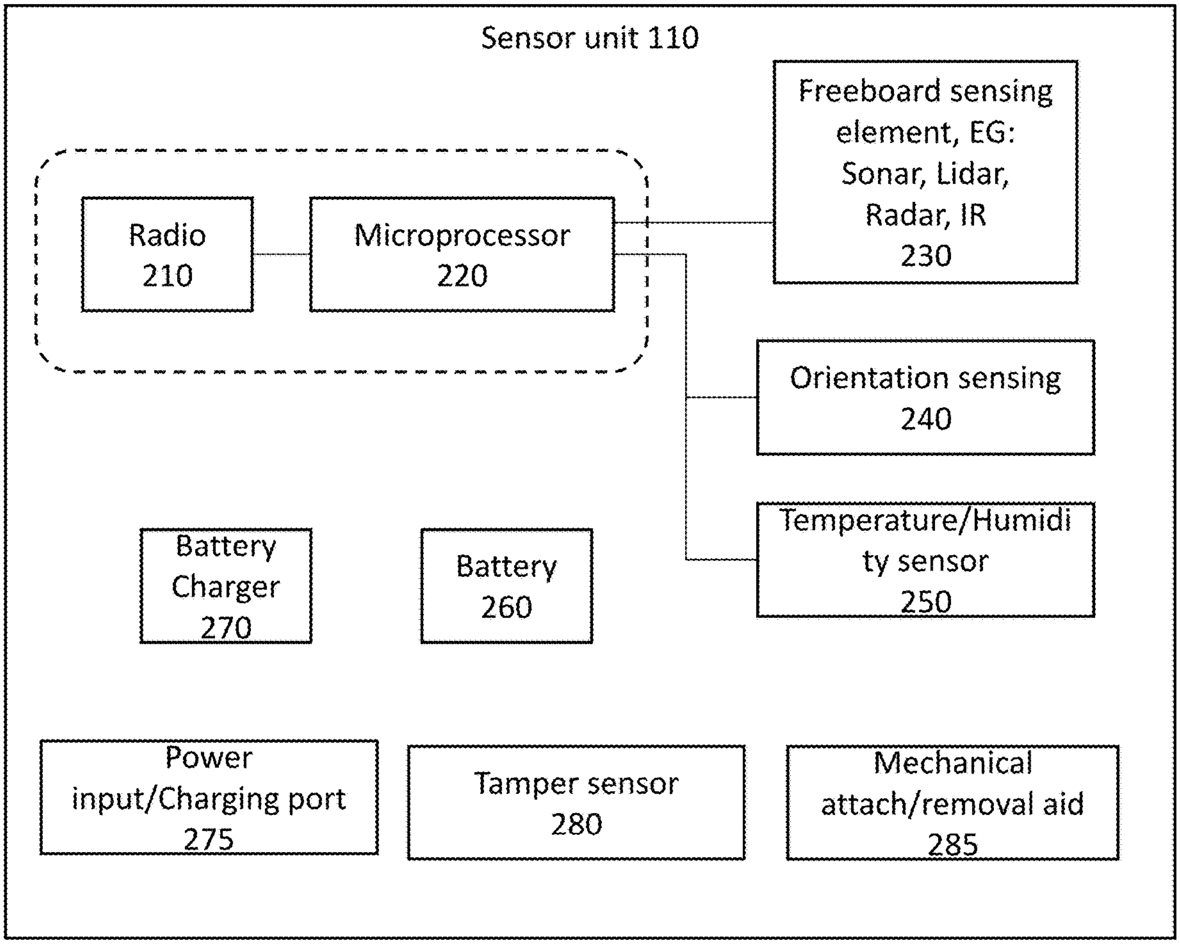
FIG. 2 is a block diagram illustrating the architecture of the sensor unit of the system, according to an exemplary embodiment of the present invention.

FIG. 2 is a block diagram showing an architecture of a sensor unit. The sensor unit 110 can include a radio 210; a microprocessor 220; freeboard sensing elements 230, such as Sonar, LIDAR, Radar, IR distance sensors, and the like; orientation sensing circuitry 240; temperature/humidity sensor 250; a battery 260; a battery charging circuitry 270; a charging port 275; a tampering detection sensor 280; and a mechanical attachment aid, such as magnets.

Figure 3:
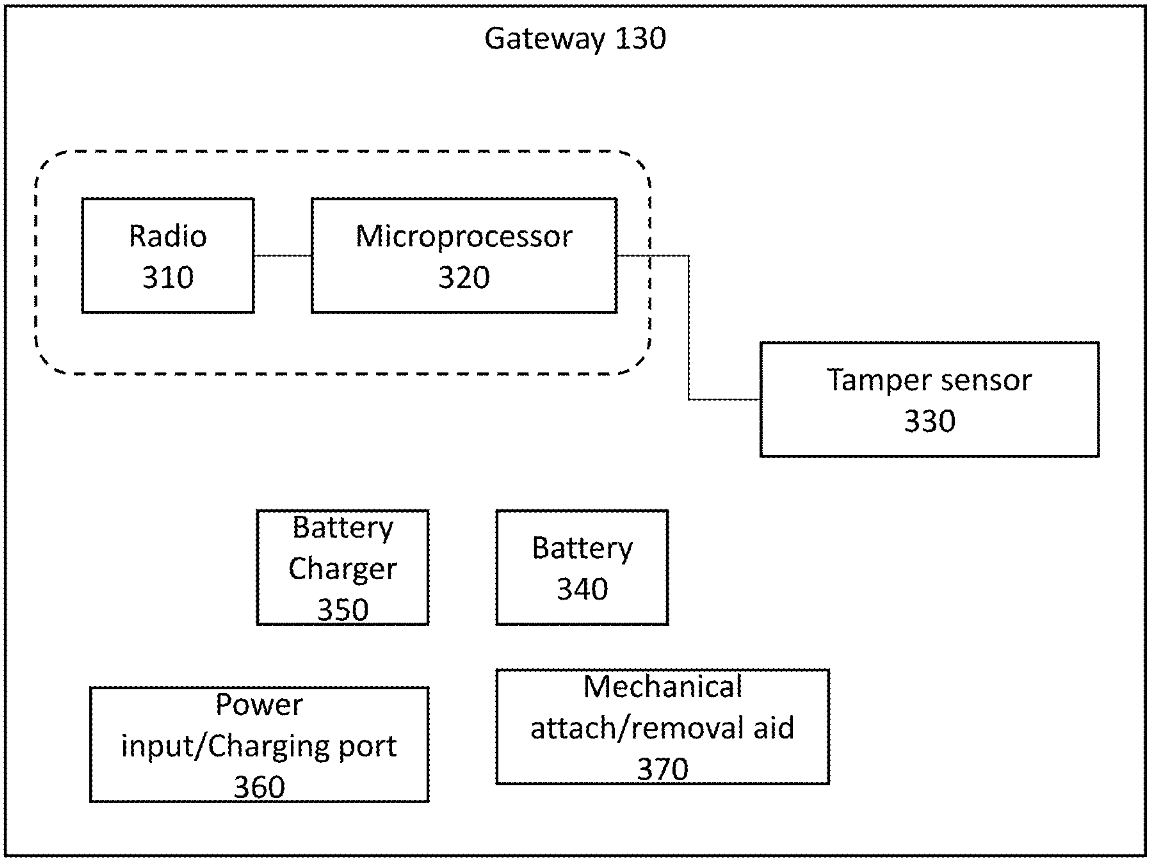
FIG. 3 is a block diagram illustrating an architecture of a gateway unit of the system, according to an exemplary embodiment of the present invention.

Referring to FIG. 3 is a block diagram illustrating the architecture of gateway unit 130. The gateway unit 130 includes a radio 310, a microprocessor 320, a tampering detection sensor 330, a battery 340, a battery charging circuitry 350, a charging port 360, and a mechanical attachment aid 370, such as magnets.

In certain implementations, the system further allows flexible and autonomous utilization of either known ancillary sensor position and said sensors known freeboard and tilt information; in addition to or in conjunction with manually entered information (freeboard measurement/observation) which may seamlessly override sensor information until it is available; with said datapoints used to tare, or zero out, tilt information from each sensor to account for sensor placement anomalies. Each sensor additionally maintains its own active and adjusted tilt information which can be updated dynamically at any time during operation; as well as being manually overridden.

What is claimed is:

1. A method for continuously determining and visualizing a draft/freeboard of a waterborne vessel undergoing loading, the method executed at least by a control unit and implemented using a system, the method comprising:

providing one or more sensor units mounted to the waterborne vessel, wherein each of the one or more sensor units comprises:

a housing, a distance sensor configured to determine a freeboard of the waterborne vessel, the distance sensor encased within the housing, and a coupling member coupled to the housing, the coupling member is configured to allow the sensor unit to be mounted to the waterborne vessel;

receiving by the control unit, freeboard measurement data from the distance sensor;

automatically determining, by the control unit and based on the received freeboard measurement data, a draft or freeboard for the waterborne vessel during loading;

rendering a user interface on an external computing device located remotely from the waterborne vessel, such that the freeboard/draft of the waterborne vessel is monitored and the system is operated without requiring an operator to be present at an upper deck of the waterborne vessel;

presenting through the interface, in real time, freeboard/draft data and changes in the freeboard/draft of the water borne vessel during loading;

generating a notification when a loading capacity in a predefined area of the waterborne vessel is reached based on predefined freeboard/draft thresholds for one or more corners of the waterborne vessel;

presenting, through the user interface, a graphical object depicting the waterborne vessel;

permitting, through the user interface, selection of a barge orientation corresponding to a bow and stern orientation during loading;

presenting, graphically through the user interface, a center of mass of the waterborne vessel and change in position of the center of mass during loading, wherein the center of mass indicates levelness of the waterborne vessel;

permitting, through the user interface, selection of a rake offset to account for additional height contributed by a raked bow of the waterborne vessel to the freeboard/draft;

receiving, through the user interface, trim and tilt limits representing allowable tolerance of error in front-to-back and side-to-side orientations of the waterborne vessel, wherein the trim and tilt limits are used to determine the center of mass;

receiving, through the user interface, tonnage targets for the waterborne vessel and presenting estimated tonnage in real time based on the determined freeboard or draft; and receiving, through the user interface, an amount of water present in the waterborne vessel, wherein the amount of water affects the estimated tonnage.

2. The method according to claim 1, wherein the coupling member comprises one or more magnets encased within the respective housing, wherein the method comprises:

mounting the one or more sensor units to the waterborne vessel through the one or more magnets.

3. The method according to claim 1, wherein each of the one or more sensor units further comprises:

a radio member configured to connect each of the one or more sensor units to the control unit.

4. The method according to claim 3, wherein the system further comprises:

a gateway unit operably coupled to the one or more sensor units, wherein the gateway unit is configured to aggregate data from the one or more sensor units, wherein the gateway unit is configured to connect to the control unit.

5. The method according to claim 1, wherein the distance sensor is selected from a group consisting of Lidar, Sonar, Radar, Infrared distance sensor, and a combination thereof.

6. The method according to claim 1, wherein each of the one or more sensor units further comprises:

an inclinometer configured to detect an elevation/tilt of the waterborne vessel.

7. The method according to claim 6, wherein the one or more sensor units are configured to determine a freeboard at a first corner and tilt information of the waterborne vessel along two perpendicular axis thereof, the control unit configured to:

receive dimensions of the waterborne vessel, receive tilt information form the inclinometer, determine a placement of the one or more sensor units on the waterborne vessel, and determine freeboard at a second corner, a third corner, and a fourth corner based on the tilt information, the freeboard measurement at the first corner, and the determined placement of the one or more sensor units.

8. The method according to claim 7, wherein determination of the draft is further based on the dimensions of the waterborne vessel.

9. The method according to claim 1, wherein the method further comprises:

initializing and stopping the system or the one or more sensor units automatically.

10. The method according to claim 7, wherein the method further comprises:

storing freeboard/draft data for the waterborne vessel for a predetermined duration; and using the stored freeboard/draft data to aid in loading of the waterborne vessel, wherein freeboard/draft of the waterborne vessel measured in real time is compared with the stored freeboard/draft data.

11. The method according to claim 1, wherein the method further comprises:

receiving, by the control unit, manually entered freeboard information that selectively overrides the measured freeboard data until updated sensor data becomes available;

using the measured freeboard data, the measured tilt information, and the manually entered freeboard information to tare or zero tilt information from each sensor unit to compensate for sensor placement anomalies; and maintaining, for each sensor unit, both active tilt information and adjusted tilt information, wherein the active tilt information and the adjusted tilt information are dynamically updatable during operation and manually overridable.

* * * * *